(12) United States Patent
Stover et al.

(10) Patent No.: US 10,247,821 B1
(45) Date of Patent: Apr. 2, 2019

(54) PANORAMIC WEATHER RADAR DISPLAY SYSTEM FOR AIRCRAFT

(71) Applicant: Rockwell Collins, Inc., Cedar Rapids, IA (US)

(72) Inventors: Keith A. Stover, Lisbon, IA (US); Eric N. Anderson, Marion, IA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 0 days.

(21) Appl. No.: 15/669,067

(22) Filed: Aug. 4, 2017

(51) Int. Cl.
*G01S 13/95* (2006.01)
*G01S 7/06* (2006.01)
*G08G 5/00* (2006.01)
*G01W 1/10* (2006.01)

(52) U.S. Cl.
CPC ............ *G01S 13/953* (2013.01); *G01S 7/064* (2013.01); *G01W 1/10* (2013.01); *G08G 5/0091* (2013.01)

(58) Field of Classification Search
CPC ........ G01S 13/953; G01S 7/064; G01W 1/10; G08G 5/0091
USPC ....... 340/949, 968, 974, 975, 979; 342/26 R, 342/26 B
See application file for complete search history.

(56) References Cited

U.S. PATENT DOCUMENTS

| | | | | |
|---|---|---|---|---|
| 6,653,947 B2* | 11/2003 | Dwyer | ............. | G01C 23/00 340/970 |
| 6,828,922 B1* | 12/2004 | Gremmert | ............. | G01S 7/003 340/949 |
| 6,867,711 B1* | 3/2005 | Langner | ............. | G01C 23/00 340/973 |
| 6,977,608 B1* | 12/2005 | Anderson | ............. | G01C 21/16 340/945 |
| 6,995,690 B1* | 2/2006 | Chen | ............. | G01C 23/00 340/961 |
| 7,609,200 B1* | 10/2009 | Woodell | ............. | G01S 13/953 342/176 |
| 7,633,428 B1* | 12/2009 | McCusker | ............. | G01S 7/003 342/26 B |
| 8,643,533 B1* | 2/2014 | Woodell | ............. | G01S 13/953 342/118 |
| 9,019,145 B1 | 4/2015 | Sishtla et al. | | |
| 9,019,147 B1* | 4/2015 | Oranskiy | ............. | G01S 7/14 342/26 R |

(Continued)

*Primary Examiner* — Adnan Aziz
(74) *Attorney, Agent, or Firm* — Donna P. Suchy; Daniel M. Barbieri

(57) ABSTRACT

A weather radar system for an aircraft includes a weather radar system and a processing circuit. The weather radar system is configured to determine weather data, the weather data including an indication of precipitation at a plurality of altitudes, a plurality of azimuth angles, and at a plurality of ranges from the aircraft. The processing circuit is configured to receive the weather data from the weather radar system and generate an overhead display from an overhead perspective based on the weather data. The overhead display visually illustrates the precipitation at a particular distance from the aircraft and at a particular azimuth angle. The processing circuit is configured to generate a face-on on display based on the weather data and cause a display screen to display the overhead display and the face-on display. The face-on display visually illustrates a particular altitude of the precipitation and the azimuth angle of the precipitation.

20 Claims, 8 Drawing Sheets

(56) References Cited

U.S. PATENT DOCUMENTS

| | | | | |
|---|---|---|---|---|
| 9,499,278 B1* | 11/2016 | Finley | ................ | B64D 45/00 |
| 9,535,158 B1 | 1/2017 | Breiholz et al. | | |
| 9,823,347 B1* | 11/2017 | Koenigs | ................ | G01S 13/953 |
| 2009/0267800 A1* | 10/2009 | Hammack | ............... | G01C 23/00 |
| | | | | 340/973 |
| 2014/0039734 A1* | 2/2014 | Ramaiah | ................ | G01W 1/02 |
| | | | | 701/14 |
| 2014/0222327 A1* | 8/2014 | Burgin | ................ | G08G 5/0047 |
| | | | | 701/409 |
| 2016/0131739 A1* | 5/2016 | Jinkins | ................ | G01S 13/953 |
| | | | | 342/26 B |
| 2016/0343261 A1* | 11/2016 | Branthomme | ......... | G01C 23/00 |
| 2018/0074189 A1* | 3/2018 | Khatwa | ................ | G01S 7/003 |
| 2018/0149745 A1* | 5/2018 | Christianson | ........... | G01S 7/003 |

* cited by examiner

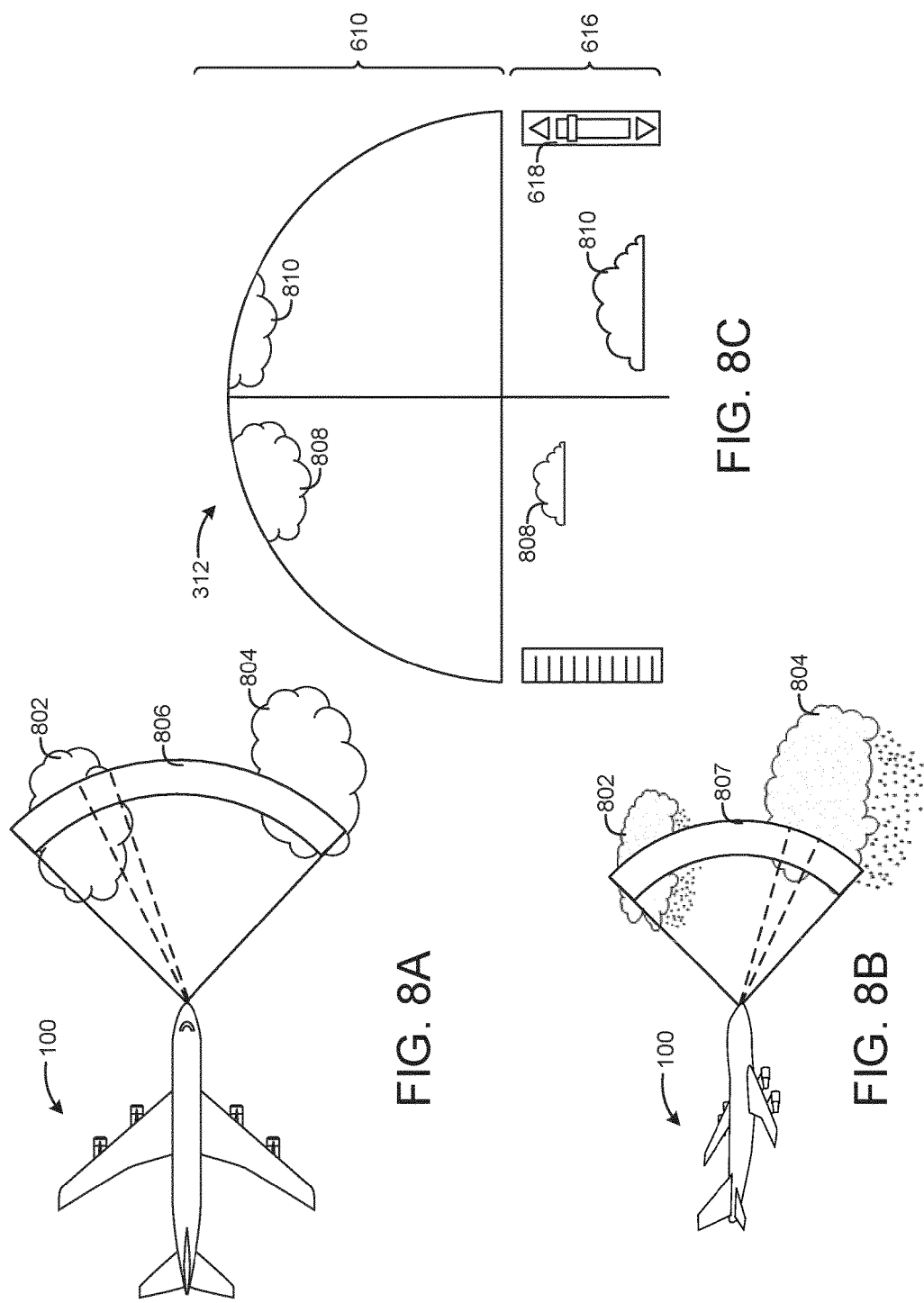

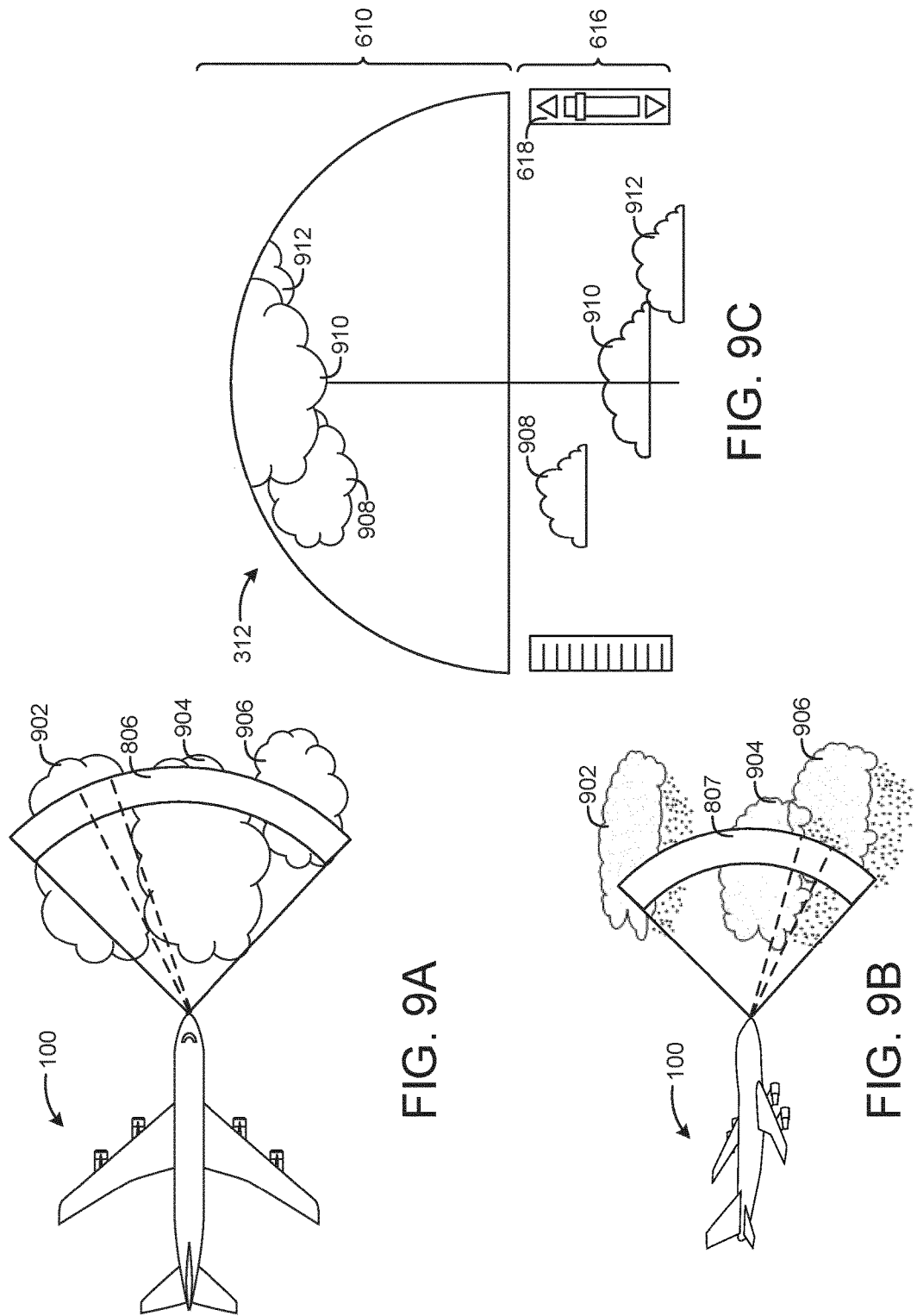

PANORAMIC WEATHER RADAR DISPLAY SYSTEM FOR AIRCRAFT

BACKGROUND

Embodiments of the inventive concepts disclosed herein relate generally to the field of weather radar. More particularly, embodiments of the inventive concepts disclosed herein relate to systems and methods for displaying weather radar in an aircraft cockpit.

Weather radar systems can be configured to identify precipitation. To identify precipitation, the weather radar system can transmit and receive radio waves. The transmitted waves may be scattered by precipitation. Some energy of the transmitted wave may be reflected off the precipitation back to the weather radar system. Based on the intensity of the received waves, the presence of the precipitation can be determined. Aircraft can be equipped with weather radar systems. The weather radar systems of aircraft can be configured to identify precipitation surrounding the aircraft. A pilot of the aircraft may use weather radar data collected by the weather radar system to navigate an aircraft and avoid heavy precipitation. A pilot may rely on the weather radar data to avoid flying through precipitation and possibly damaging the aircraft or discomforting passengers of the aircraft.

SUMMARY

In one aspect, the inventive concepts disclosed herein are directed to a radar system for an aircraft. The radar system includes a weather radar system including an antenna system configured to transmit and receive signals. The weather radar system is configured to determine weather data based on the received signals, the weather data including an indication of precipitation at a plurality of altitudes, a plurality of azimuth angles, and at a plurality of ranges from the aircraft. The radar system includes a processing circuit configured to receive the weather data from the weather radar system. The processing circuit is configured to generate an overhead display from an overhead perspective based on the weather data. The overhead display visually illustrates the precipitation at a particular distance from the aircraft and at a particular azimuth angle. The processing circuit is configured to generate a face-on on display from a first person perspective based on the weather data. The face-on display visually illustrates a particular altitude of the precipitation and the azimuth angle of the precipitation. The processing circuit is configured to cause a display screen to display the overhead display and the face-on display.

In a further aspect, the inventive concepts disclosed herein are directed to an method for a radar system for an aircraft. The method includes determining, by a weather radar system, weather data based on a received signals. The weather radar system transmits and receives signals via an antenna system. The method further includes receiving, by a panoramic weather display system, weather data from the weather radar system, the weather data including an indication of precipitation at a plurality of altitudes, a plurality of azimuth angles, and at a plurality of ranges from the aircraft. The method includes generating, by the panoramic weather display system, an overhead display from an overhead perspective based on the weather data, the overhead display visually illustrates the precipitation at a particular distance from the aircraft and at a particular azimuth angle. The method further includes generating, by the panoramic weather display system, a face-on on display from a first person perspective based on the weather data, the face-on display visually illustrates a particular altitude of the precipitation and the particular azimuth angle of the precipitation. The method includes causing, by the panoramic weather display system, a display screen to display the overhead display and the face-on display.

In a further aspect, the inventive concepts disclosed herein are directed to a radar system for an aircraft. The radar system includes an antenna system configured to transmit and receive signals. The weather radar system is configured to determine weather data based on the received signals, the weather data including an indication of precipitation at a plurality of altitudes, a plurality of azimuth angles, and at a plurality of ranges from the aircraft. The radar system includes a processing circuit configured to receive the weather data from the weather radar system and generate an overhead display from an overhead perspective based on the weather data, the overhead display visually illustrates the precipitation at a particular distance from the aircraft and at a particular azimuth angle. The processing circuit is configured to generate a face-on on display from a first person perspective based on the weather data, the face-on display visually illustrates the precipitation across a range of azimuth angles and at a range of altitudes. The processing circuit is configured to cause a display screen to display the overhead display and the face-on display.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings:

FIG. 8A is a schematic drawing of the aircraft of FIG. 1 and storm systems shown from a top view according to exemplary aspects of the inventive concepts disclosed herein.

FIG. 8B is a schematic drawing of the aircraft of FIG. 8A and the storm systems of FIG. 8A from a side view according to exemplary aspects of the inventive concepts disclosed herein.

FIG. 8C is an illustration of the overhead display and the face-on display generated by the panoramic weather display system of FIG. 3 being displayed on the radar display screen of FIG. 3 with respect to the storm systems of FIGS. 8A-8B according to exemplary aspects of the inventive concepts disclosed herein.

FIG. 9A is a schematic drawing of the aircraft of FIG. 1 and storm systems shown from a top view according to exemplary aspects of the inventive concepts disclosed herein.

FIG. 9B is a schematic drawing of the aircraft of FIG. 9A and the storm systems of FIG. 9A from a side view according to exemplary aspects of the inventive concepts disclosed herein.

FIG. 9C is an illustration of the overhead display and the face-on display generated by the panoramic weather display system of FIG. 3 being displayed on the radar display screen of FIG. 3 with respect to the storm systems of FIGS. 9A-9B according to exemplary aspects of the inventive concepts disclosed herein.

DETAILED DESCRIPTION

Figure 1:
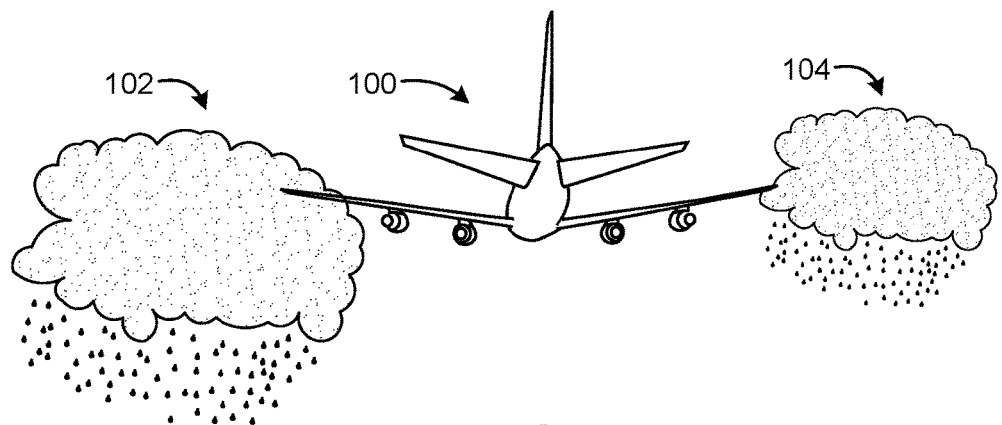
FIG. 1 is a perspective view schematic drawing of an aircraft and two storm cells according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods for a panoramic weather display for aircraft are described with respect to various aspects of the inventive concepts. Pilots of aircraft may need to navigate the aircraft such that the aircraft does not pass through heavy precipitation or otherwise fly through a storm. The panoramic weather radar display described herein may help a pilot to navigate laterally to avoid the storm via an overhead display. The overhead display may show the aircraft from a top view (overhead view) and precipitation at a plurality of azimuth angles and distances from the aircraft. The panoramic weather radar display described herein may also have a face-on display that illustrates the altitude of the storm from a first-person perspective. The face-on display may illustrate precipitation at a plurality of altitudes (e.g., a range of altitudes) across a range of azimuth angle from a first-person perspective, the perspective of the aircraft. The face-on display may allow the pilot to make vertical deviations to fly over precipitation.

By including both an overhead display and a face-on display in a weather radar display system, a pilot can make multiple flight path deviations to avoid precipitation and storms. Since the overhead display and the face-on display illustrate precipitation across a range of azimuth angles, the pilot can make lateral flight path deviations to avoid the storm. Further, based particularly on the face-on display, the pilot can view the storm at a plurality of altitudes across a range of azimuth angles. Being able to view the storm at a plurality of altitudes and across a range of azimuth angles can allow the pilot to determine if the pilot can make a vertical flight path deviation to avoid the storm.

By allowing a pilot to make either a vertical deviation or a lateral deviation, multiple benefits can be realized. The pilot may be able to make sure that the aircraft does not pass through a storm. This may avoid any unnecessary wear on the aircraft and prevent damage to the aircraft. Further, avoiding storms either laterally or vertically may make more comfortable trips for passengers since unnecessary turbulence can be avoided by making vertical or lateral deviations. Finally, fuel of the aircraft can be conserved. In some cases, a vertical deviation is a smaller overall deviation than an lateral deviation. This may conserve fuel.

Referring now to FIG. 1, an aircraft 100 and two storm cells 102 and 104 are shown according to an exemplary embodiment. The aircraft 100 may be any kind of commercial aircraft, military aircraft, helicopter, unmanned aerial vehicle (UAV), spacecraft, and/or any other kind of vehicle, manned or unmanned. The storm cells 102 and 104 are shown in FIG. 1. The storm cells 102 and 104 may be any kind of storm cell e.g., single cell storms, multi-cell cluster storms, multi-cell line storms, or supercells. As shown, the storm cells 102 and 104 create precipitation. The precipitation may be rain, snow, or sleet.

In order to avoid the storm cells 102 and 104, a pilot of the aircraft 100 can make two different types of deviations. In some embodiments, the pilot of the aircraft 100 may navigate the aircraft 100 to perform a vertical deviation and fly the aircraft 100 over the tops of the storm cells 102 and/or 104. The pilot of the aircraft 100 can further perform a lateral deviation and fly the aircraft 100 around the storm cells 102 and/or 104. The systems that the pilot of the aircraft 100 can use to determine whether to perform vertical and/or lateral deviations are described in further detail in FIG. 2.

Figure 2:
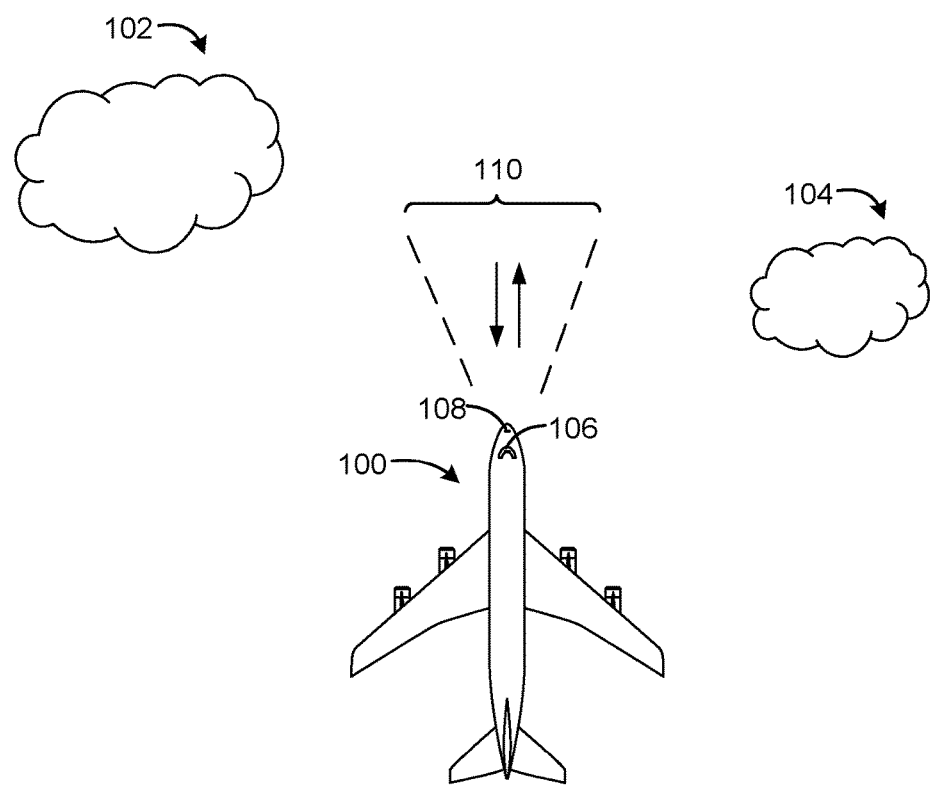
FIG. 2 is a perspective view schematic drawing of the aircraft of FIG. 1 which includes a weather radar system and a panoramic weather display system according to exemplary aspects of the inventive concepts disclosed herein.

Referring now to FIG. 2, the aircraft 100 including a weather radar system 108 and a panoramic weather display system 106 are shown according to an exemplary embodiment. The weather radar system 108 can be a system including one or more antennas, the system being configured to determine precipitation and/or precipitation rates surrounding the aircraft 100. The weather radar system 108 can be configured to determine precipitation at a plurality of altitudes, a plurality of distances from the aircraft 100, and a plurality of azimuth angles. In some embodiments, the weather radar system 108 is the Rockwell Collins Multi-Scan™ radar. Examples of weather radar systems may be found in U.S. patent application Ser. No. 13/183,314 (now U.S. Pat. No. 9,019,145) filed Jul. 14, 2011, the entirety of which is incorporated by reference herein. Another example of a weather radar system can be found in U.S. patent application Ser. No. 14/465,753 (now U.S. Pat. No. 9,535,158) Aug. 21, 2014, the entirety of which is incorporated by reference herein.

The weather radar system 108 can be configured to transmit and receive signals 110 via an antenna system. The transmitted signals may be scattered by precipitation and a reflection of the transmitted signal may be returned to the weather radar system 108. Based on the transmitted and/or the received signals 110, the weather radar system 108 can determine precipitation at altitudes, ranges, and azimuth angles. For example, based on the intensity of the received signal, the precipitation rate can be determined. Based on the time it takes to receive a reflection of a transmitted signal, the distance of the precipitation can be determined. The weather radar system 108 can scan multiple azimuth angles, ranges, and/or altitudes and determine precipitation and/or precipitation rates at multiple ranges, altitudes, and/or azimuth angles.

Based on the precipitation at altitudes, ranges, and azimuth angles, the panoramic weather display system 106 can be configured to generate an overhead display and a face-on display. The overhead display may indicate precipitation and/or precipitation rates at a plurality of ranges and azimuth angles. The ranges may be the distance from the aircraft 100 in the direction of travel of the aircraft 100. The azimuth angle may be a plurality of angles which are measured from the direction of travel of the aircraft 100.

The panoramic weather display system 106 can be configured to generate a face-on display. The face-on display generated by the panoramic weather display system 106 may include precipitation and/or precipitation rates at a plurality of altitudes and azimuth angles. The panoramic weather display system 106 may cause a display screen to display both the overhead display and the face-on display that the panoramic weather display system 106 generates. Since the display screen displays precipitation and/or precipitation rates at a plurality of altitudes, ranges, and azimuth angles, the display, the combination of the overhead display the face-on display, can be considered a panoramic weather radar display. Based on the panoramic weather radar display, a pilot can determine whether to make either vertical or lateral deviations to avoid precipitation (or lightening) i.e., to avoid turbulence or possible damage to the aircraft 100.

Figure 3:
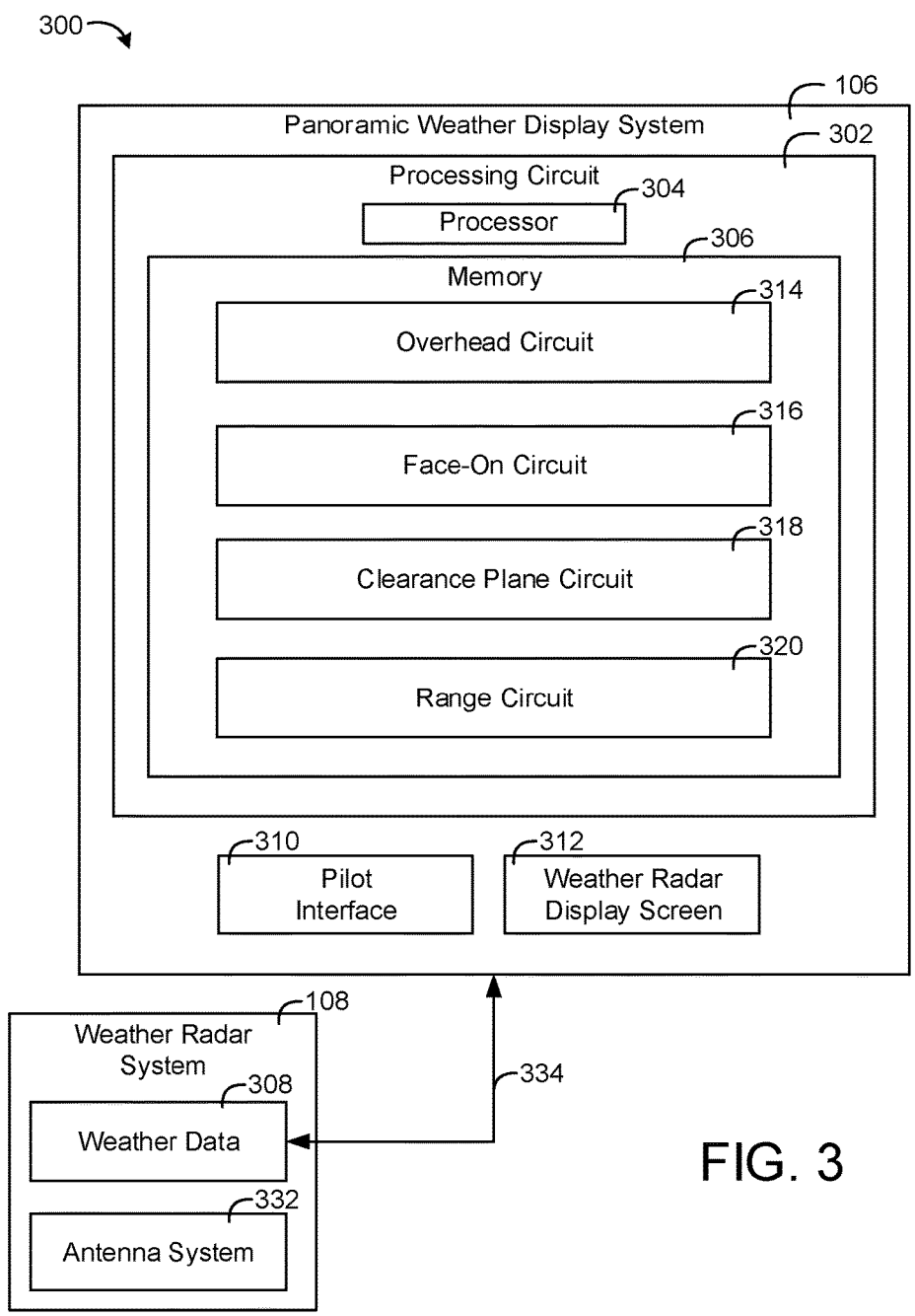
FIG. 3 is a block diagram of the panoramic weather display system of FIG. 2 in greater detail including a weather radar display screen according to exemplary aspects of the inventive concepts disclosed herein.

Referring now to FIG. 3, a radar system 300 is shown, according to an exemplary embodiment. The radar system 300 is shown to include the panoramic weather display system 106. The panoramic weather display system 106 is shown to include a processing circuit 302, a pilot interface 310, and a weather radar display screen 312. The radar system 300 is further shown to include the weather radar system 108.

The weather radar system 108 is described with further reference to FIG. 2. The weather radar system 108 is shown to include an antenna system 332. The antenna system 332 may be one or more antennas used to transmit and receive radio waves. Based on the transmitted and received radio waves, the weather radar system 108 can determine precipitation and/or precipitation rates surrounding the aircraft 100. The weather radar system 108 may include one or more processing circuits (e.g., processors, memory, transitory and/or non-transitory storage media, etc.). The processing circuits, processors, or memory may be the same as or similar to the processing circuit 302, a processor 304, and/or memory 306. The weather radar system 108 can generate weather data 308 based on the transmitted and/or received signals of the antenna system 332. The weather data 308 may indicate precipitation, precipitation rates, storm cells, etc. at a plurality of azimuth angles, ranges (e.g., distance from the aircraft 100), and altitudes. In some embodiments, the weather data 308 indicates precipitation, precipitation rates, and/or storm cells in a spherical coordinate system, a cylindrical coordinate system, and/or a Cartesian coordinate system.

The weather radar system 108 is shown to communicate the weather data 308 to the panoramic weather display system 106. The weather data 308 may be weather data generated by the weather radar system 108. The weather data 308 may indicate precipitation and/or precipitation rates in three dimensional space surrounding and/or in front of the aircraft 100. The weather data 308 may indicate precipitation and/or precipitation rates at a plurality of ranges from the aircraft 100, at a plurality of azimuth angle (e.g., azimuth angle measured from the direction of travel of the aircraft 100), and at a plurality of altitudes. The weather data 308 may be stored as any data structure. The weather data 308 may be one or more matrixes that indicate precipitation in three dimensional space.

The weather radar system 108 can communicate the weather data 308 via a connection 334. The weather radar system 108 can communicate with the panoramic weather display system 106 via the connection 334 which may be any electrical connection, physical cable(s), and/or wireless connection, and/or network. The weather radar system 108 and the panoramic weather display system 106 can be configured to communicate via ARINC communication protocols, a local area network (LAN), serial cables, RS-485, RS-232, Ethernet cables, etc. The weather radar system 108 can be a MultiScan™ manufactured by Rockwell Collins, Inc. or other volumetric scanning systems configured as described herein.

The panoramic weather display system 106 is shown to include the pilot interface 310 and the weather radar display screen 312. The pilot interface 310 may be one or more buttons, knobs, switches, keypads, and/or any other instrument that can be used to generate an input for the panoramic weather display system 106. The pilot interface 310 may include a cursor control input (e.g., a mouse, a trackball, or a trackpad), dedicated control inputs (e.g., one or more dedicated control knobs or one or more dedicated buttons), non-dedicated control inputs (e.g., a tabber knob, a selection mechanism, or a button), and/or typed entry fields (e.g., a keyboard).

The weather radar display screen 312 may be any type of display screen that the overhead display and/or the face-on display can be visually displayed. The weather radar display screen 312 may be any cathode ray tube (CRT), light-emitting diode display (LED), electroluminescent display (ELD), plasma display panel (PDP), liquid crystal display (LCD), organic light-emitting diode display (OLED), holographic display, and/or any other type of display screen. In some embodiments, the pilot interface 310 and the weather radar display screen 312 are combined e.g., a display screen surrounded by buttons. In various embodiments, the weather radar display screen 312 and the pilot interface 310 are combined as a touch screen interface. The touch screen interface may be a resistive touch screen interface, a single-capacitive display screen, and/or a multi-capacitive display screen. The pilot interface 310 and weather radar display screen 312 may include any type of input and/or output configured to receive input from a pilot and visually display output to the pilot.

The processing circuit 302 is shown to include the processor 304 and the memory 306. The processing circuit 302 may include at least one processor 304, which may be any type of general purpose or special purpose processor (e.g., FPGA, CPLD, ASIC). The processing circuit 302 also includes at least one memory 306, which may be any type of non-transitory computer or machine-readable storage medium (e.g., ROM, RAM, hard disk, flash memory).

Figure 6:
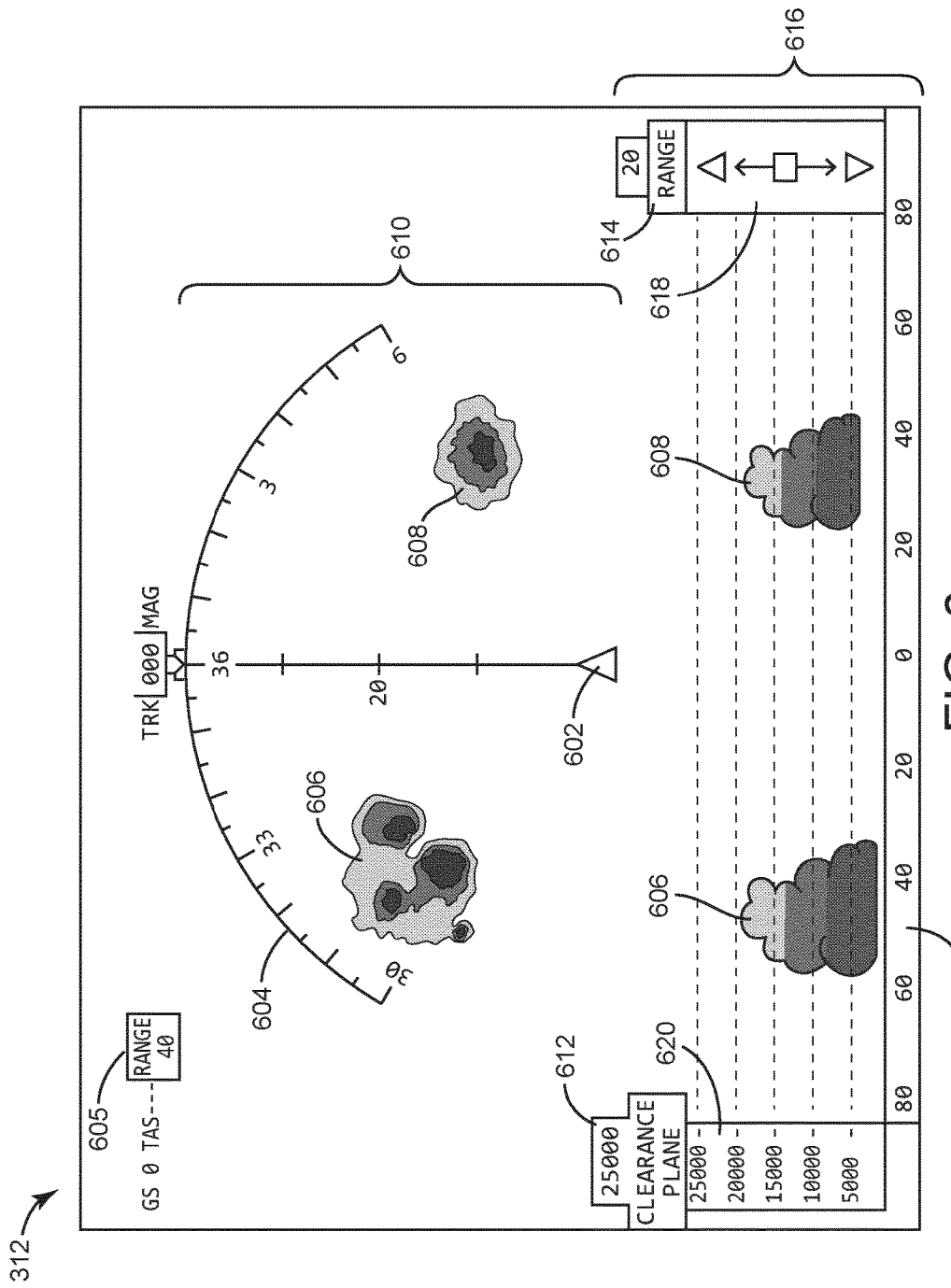
FIG. 6 is an illustration of the overhead display and the face-on display generated by the panoramic weather display system of FIG. 3 being displayed on the radar display screen of FIG. 3 according to exemplary aspects of the inventive concepts disclosed herein.

The memory 306 is shown to include an overhead circuit 314. The overhead circuit 314 can be configured to generate the overhead display based on the weather data 308 (e.g., an overhead display 610 as shown in FIG. 6). The overhead circuit 314 may generate the overhead display to visually illustrate precipitation at a plurality of ranges and azimuth angles. The precipitation may be illustrated in color to visually identify the rate of precipitation. Red may indicate one range of precipitation rates, yellow may indicate a second range of precipitation rates, while green may indicate a third range of precipitation rates. The storm cells 102 and 104 may be indicated on the overhead display at a particular range from the aircraft 100 (e.g., a distance from the front or center of the aircraft 100) and at an azimuth angle. The overhead circuit 314 can be configured to cause the weather radar display screen 312 to display the overhead display it generates.

In some embodiments, the overhead circuit 314 can be configured to receive an input range from a range circuit 320. The overhead circuit 314 can be configured to generate an arc (e.g., a range arc 607 shown in FIG. 7) which may identify the input range. The range arc may have a radius equal (in scale) to the input range. Since the face-on display generated by a face-on circuit 316 may be illustrating a particular two dimensional cross section at the input range, the range arc displayed in the overhead display may provide context for the cross section. For example, if in the overhead display a storm cell ranges from 20 NM to 30 NM, a pilot may input 25 NM as the input range. In the overhead display, the arc may be placed at 25 NM while the cross section of the storm at 25 NM may be shown in the face-on display. This is described in further detail in FIG. 7.

The face-on circuit 316 can be configured to generate a face-on display based on the weather data 308. The face-on display generated by the face-on circuit 316 may be the face-on display shown in FIG. 6 i.e., a face-on display 616. The face-on display generated by the face-on circuit 316 may illustrate precipitation and/or precipitation rates at a plurality of altitudes and azimuth angles. The face-on display may be visually presented from a first-person perspective such that a pilot can see the precipitation to the left and right of the aircraft 100 and the altitude of the precipitation. The face-on display generated by the face-on circuit 316 may indicate precipitation rates with color to visually illustrate precipitation rates. Red may indicate one range of precipitation rates, yellow may indicate a second range of precipitation rates, while green may indicate a third range of precipitation rates. The face-on circuit 316 can be configured to cause the weather radar display screen 312 to display the face-on display it generates.

The face-on display may illustrate range in three dimensions (e.g., illustrate depth) by visually changing the size of the precipitation shown on the face-on display. For example, a storm cell that is close to the aircraft 100 may be displayed larger than a storm cell that is farther away. The face-on circuit 316 and/or the overhead circuit 314 may receive a range input from the range circuit 320. The range input may indicate a particular distance from the aircraft 100 that the pilot wishes to view precipitation. In this regard, precipitation may be displayed on face-on display within the range input. For example, if a pilot would like to view precipitation between 0 and 20 nautical miles (NM) from the front of the aircraft 100, the pilot may input a range input of 20 NM. Based on the range input, face-on display may visually display precipitation from 0 to 20 NM from the aircraft 100.

In some embodiments, the face-on circuit 316 may generate face-on display as a two dimensional cross section at a particular range from the aircraft 100. In some embodiments, the range input may indicate a particular cross section that a pilot is interested in. For example, if the pilot inputs 25 NM, the cross section displayed in face-on display may be a cross section of precipitation at 25 NM from the aircraft 100.

Face-on circuit 316 can be configured to receive a clearance plane input from a clearance plane circuit 318. The clearance plane input may indicate the highest altitude that a pilot wishes to view precipitation on the face-on display. For example, a pilot may input a clearance plane of 25,000 feet. Face-on circuit 316 can be configured to determine precipitation between 0 and 25,000 feet and display the precipitation on the face-on display between 0 and 25,000 feet.

In some embodiments, the clearance plane indicates the altitude which a pilot is interested in. For example, a pilot may set the clearance plane to an altitude that the pilot is interested in vertically avoiding storm cells. For example, the face-on circuit 316 may receive a first clearance plane. The face-on circuit 316 may generate the face-on display to shown precipitation at a range of azimuth angles and a range of altitudes, the range of altitudes centered on the clearance plane. For example, if a pilot inputs a clearance plane of 25,000 feet and the altitude range is 10,000 feet, the face-on display may display precipitation across the range of azimuth angle and between 15,000 feet and 35,000 feet.

Memory 306 is shown to include the clearance plane circuit 318 and the range circuit 320. The clearance plane circuit 318 can be configured to receive a clearance plane input from the pilot interface 310 (or the weather radar display screen 312 when the weather radar display screen 312 is a touch screen) and provide the clearance plane input to the face-on circuit 316. The range circuit 320 can be configured to receive a range input from the pilot interface 310 (or the weather radar display screen 312 when the weather radar display screen 312 is a touch screen) and provide the range input to the face-on circuit 316.

The range circuit 320 can be configured to receive a width input via the pilot interface 310. The width may be used with the range input by the face-on circuit 316 to generate a face-on display. The width input can be seen via weather radar markers 806 and 807. The range input may indicate the distance from the aircraft 100 that a pilot wishes to view in the face-on display 616 while the width input may indicate the deviation from the range input that the pilot would like to be used in generating the face-on display 616. The face-on circuit 316 can be configured to generate an average precipitation rate for a face-on display 618 based on the weather data 308 for a plurality of azimuth angles and altitudes for ranges between the range input and the range input plus the width input. For example, if the pilot selects 20 NM for the range input and a width of 2 NM as the width input, the face-on circuit 316 can be configured to uses ranges 20 NM to 22 NM to generate the face-on display 616. More specifically, the face-on circuit 316 can average the precipitation for a plurality of altitudes and azimuth angles between 19 NM and 21 NM.

Figure 4:
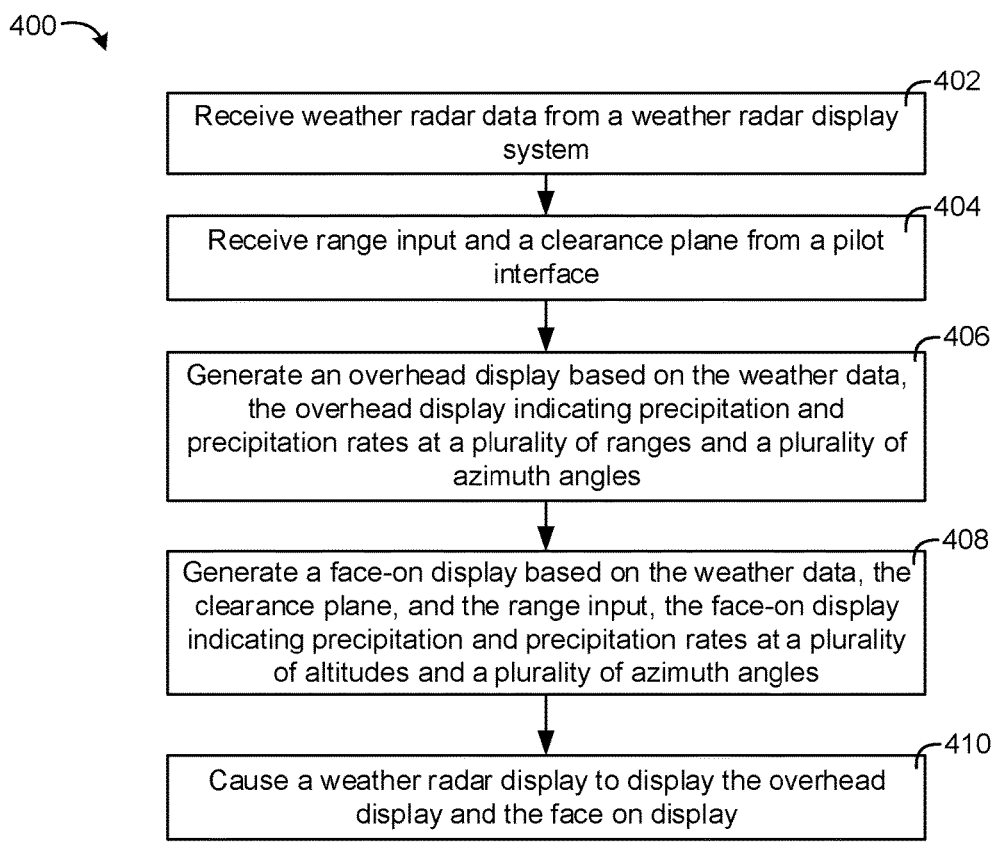
FIG. 4 is a flow chart of a process for generating, by the panoramic weather display system of FIG. 2, an overhead display and a face-on display to be displayed on the weather radar display screen of FIG. 3 according to exemplary aspects of the inventive concepts disclosed herein.

Referring now to FIG. 4, a process 400 is shown for generating the overhead display and the face-on display by the panoramic weather display system 106, according to an exemplary embodiment. The panoramic weather display system 106 can be configured to perform the process 400. However, any computing device or system described herein can be configured to perform the process 400.

In step 402, the panoramic weather display system 106 can receive the weather data 308 from the weather radar system 108. The panoramic weather display system 106 can receive the weather data 308 via the connection 334. In some embodiments, the weather data 308 indicates precipitation and/or precipitation rates in three dimensional space surrounding the aircraft 100. For example, the weather data 308 may indicate the precipitation and/or precipitation rates a plurality of altitudes, ranges, and azimuth angles. The weather radar system 108 can transmit and receive signals via the antenna system 332. Based on the transmitted and/or received signals, the weather radar system 108 can generate the weather data 308.

In step 404, the panoramic weather display system 106 can receive range input and clearance plane input from the pilot interface 310. Specifically, the range circuit 320 can receive the range input while the clearance plane circuit 318 can receive the clearance plane input. The range circuit 320 can provide the range input to the face-on circuit 316. Further, the clearance plane circuit 318 can provide the clearance plane input to the face-on circuit 316.

In step 406, the overhead circuit 314 can generate the overhead weather radar display based on the received the weather data 308. The overhead circuit 314 can generate the overhead display to visually illustrate precipitation and/or precipitation rates (e.g., based on different colors) at a plurality of ranges from the aircraft 100 and azimuth angle based on an overhead perspective. An example of the overhead display that the overhead circuit 314 can generate is the overhead display 610 as described with further reference to FIG. 6.

In some embodiments, the overhead circuit 314 receives the range input from the range circuit 320. Based on the range input, the overhead circuit 314 can generate a range arc, e.g., the range arc 607 as described with reference to FIG. 7, that has a radius equal (in scale) to the range input. In this regard, as a pilot changes the range input, the overhead circuit 314 can adjust the range arc. The range arc is shown in further detail in FIG. 7.

In step 408, the face-on circuit 316 can generate a face-on weather radar display based on the received the weather data 308. The face-on circuit 316 can generate the face-on display to visually illustrate precipitation and/or precipitation rates (e.g., based on difference colors) at a plurality of altitudes, ranges, and/or azimuth angles from a first-person perspective. In some embodiments, face-on display is a two dimensional cross section. In this embodiment, the face-on display may illustrate precipitation at a range of azimuth angle and a range of altitude. In some embodiments, the face-on display is three dimensional (e.g., it has depth). In some embodiments, via the pilot interface 310, a pilot can switch between the cross section view and the three dimensional view. In this embodiment, the face-on display may illustrate precipitation at a range of azimuth angle, a range of distances from the aircraft 100, and at a range of altitudes. An example of the face-on display that the face-on circuit 316 can generate is the face-on display 616 as described with further reference to FIG. 6.

The face-on circuit 316 can generate the face-on display based on the clearance plane and the range input. The face-on circuit 316 can generate the face-on display to visually illustrate precipitation and precipitation rates below the clearance plane or in a range of altitudes centered at the clearance plane. In some embodiments, the face-on display is a two dimensional cross section, the cross section defined by the range input.

For example, for a clearance plane of 25,000 feet, the face-on circuit 316 can display precipitation and precipitation rates from altitudes of 25,000 feet to ground (i.e., an altitude range of 25,000 feet-0 feet). Further, the face-on circuit 316 can generate the face-on display to visually illustrate precipitation and precipitation rates within the range defined by the range input. For example, if the range is 20 NM, the face-on circuit 316 can generate the face-on display to illustrate precipitation and/or precipitation rates from the aircraft 100 to 20 NM in front of the aircraft 100. In step 410, the face-on circuit 316 and the overhead circuit 314 can cause the weather radar display screen 312 to display the face-on display and overhead displays that the face-on circuit 316 and the overhead circuit 314 generate.

In another example, the face-on display may illustrate the precipitation at a range of altitudes. For example, if the clearance plane is set to 25,000 feet, and the range of altitudes is 10,000 feet, the face-on display may illustrate precipitation from 20,000 feet to 30,000 feet.

Figure 5:
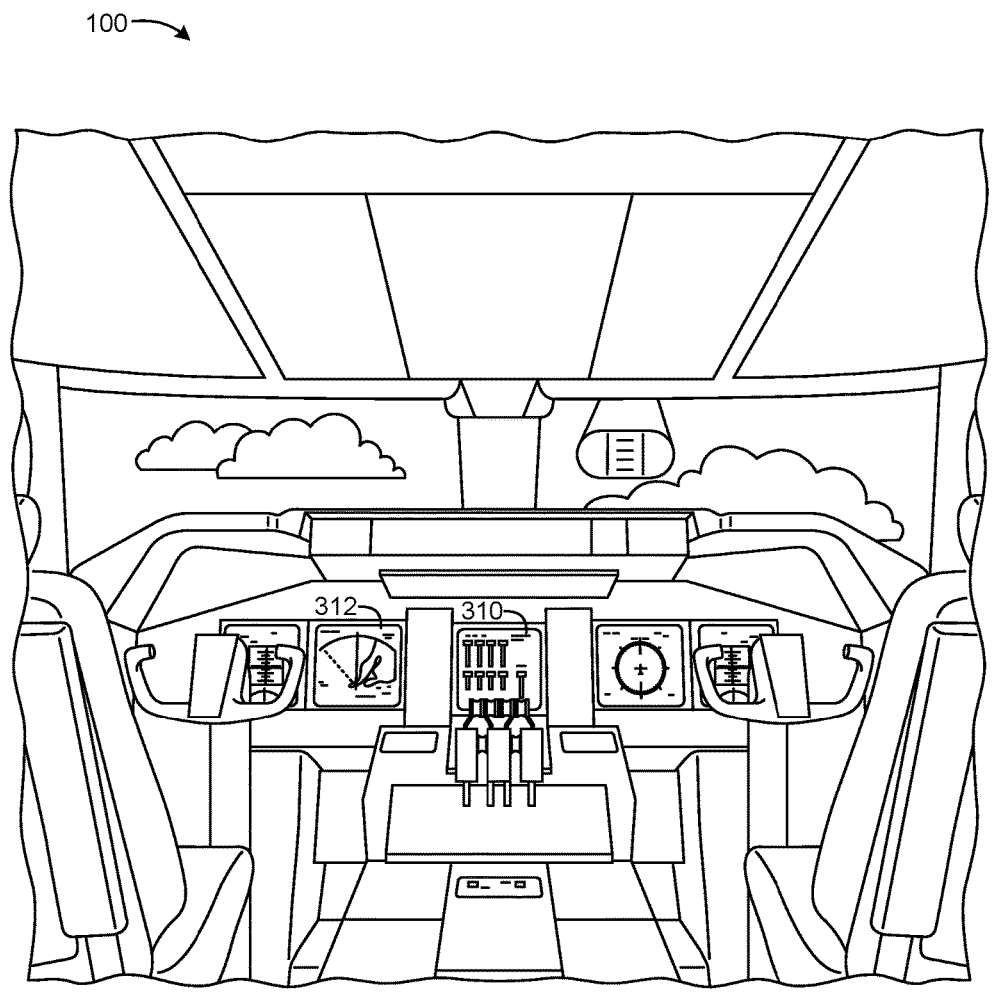
FIG. 5 is an illustration of the weather radar display screen of FIG. 2 in a cockpit of the aircraft of FIG. 1 according to exemplary aspects of the inventive concepts disclosed herein.

Referring now to FIG. 5, an illustration of a cockpit of the aircraft 100 is shown, according to an exemplary embodiment. In the aircraft 100, one or more pilots may utilize display screens e.g., the weather radar display screen 312 to view weather information. In the case of weather radar, the weather radar display screen 312 may be included in the cockpit of the aircraft 100. Further, the pilot interface 310 may be included in the cockpit to enable the pilots to interface with the panoramic weather display system 106 (e.g., input a clearance plane or range input).

Referring now to FIG. 6, the weather radar display screen 312 is shown, according to an exemplary embodiment. Weather display screen 312 is shown to display the overhead display 610 and the face-on display 616. The overhead display 610 can be generated by the overhead circuit 314 while the face-on circuit 316 can be configured to generate the face-on display 616. The systems and methods for generating the overhead display 610 and the face-on display 616 are further described with reference to FIGS. 3-4.

The overhead display 610 is shown to visually display storm cells 606 and 608 from an overhead perspective. The storm cell 606 and the storm cell 608 may correspond to the storm cell 102 and the storm cell 104 as described with reference to FIG. 1, in some embodiments. The overhead display 610 may include a marker for the aircraft 100, marker 602. This may allow a pilot to identify the distance of the storm cells 606 and 608 from the aircraft 100 in addition to the azimuth angle of the storm cells 606 and 608 with reference to the direction of travel of the aircraft 100.

The storm cells 606 and 608 illustrate precipitation and precipitation rates visually from an overhead perspective in the overhead display 610 in some embodiments. The storm cell 606 illustrates the size of a storm cell in addition to the rainfall rate. The rainfall rate may be identified based on color. This may allow a pilot to laterally deviate the aircraft 100 and avoid the storm cell 606, or at least the heaviest rate fall areas (e.g., the red areas).

Azimuth angle and a range marker 604 visually provides a pilot with the current heading of the aircraft 100 (e.g., the azimuth angle of the aircraft). Further, based on the locations of the storm cells 606 and 608, azimuth angle and the range marker 604 can allow a pilot to view what azimuth angle the storm cells 606 and 608 are located at. The range of azimuth angle displayed by azimuth angle and range marker may be a particular range of azimuth angles centered at the azimuth angle of the aircraft 100. For example, if the range is 80 degrees and the aircraft 100 is traveling at an azimuth angle of 40 degrees, azimuth angle and the range marker 604 may indicate precipitation between 0 and 80 degrees. If the range is 80 degrees and the aircraft 100 is traveling at an azimuth angle of 80 degrees, azimuth angle and the range marker 604 may indicate precipitation between 40 degrees and 120 degrees. The range may be any amount and azimuth angle and the range marker 604 may indicate azimuth angle 360 degrees surrounding the aircraft 100 or in ranges as small as one degree.

Azimuth angle and the range marker 604 may further indicate the range, the distance from the aircraft 100 to precipitation. For example, in FIG. 6, the storm cell 606 is located at a range of approximately 18 NM while the storm cell 608 is located at a range of approximately 10 NM. In various embodiments, adjusting the range slider 618, the range indicated by azimuth angle and the range marker 604 can be adjusted. In some embodiments, the overhead display 610 has its own range input, e.g., a range input 605. In FIG. 6, the range input 605 is set to 40 NM. The pilot can change the range input for the overhead display 610 via the pilot interface 310.

The face-on display 616 illustrates the storm cells 606 and 608 from a first person perspective, the first person perspective being the perspective of the aircraft 100. In FIG. 6, a azimuth angle range indicator 622 indicates the range of azimuth angle and indicates the location of the storm cell 606 and 608 with respect to the direction of travel of the aircraft 100. The direction of the aircraft 100 is illustrated in FIG. 6 as 0 degrees while the locations of the storm cells 606 and 608 are illustrated to be located at approximately 45 degrees to the left of the aircraft 100 and 35 degrees to the right of the aircraft 100. In various embodiments, the azimuth angles illustrated by the azimuth angle range indicator 622 has a reference of 0 degrees being north instead of using the direction of travel of the aircraft 100 as the reference (e.g., using the direction of travel of the aircraft 100 as 0 degrees.).

An altitude indicator 620 indicates the altitude of the storm cells 606 and 608. Storm cell includes precipitation between approximately 2,500 feet and 20,000 feet. The precipitation rate of the storm cell 606 is shown to be heaviest from 2,500 feet to 5,000 feet. A clearance plane indicator 612 illustrates the clearance plane input that a pilot may input via the pilot interface 310. The clearance plane indicator 612 may indicate the highest altitude that the pilot would like displayed on the face-on display 616. The clearance plane input may be selected by a pilot based on the highest altitude that the pilot will or can fly the aircraft 100.

In some embodiments, the face-on display 616 displays precipitation over a fixed range (e.g., 0 to 50,000 feet) of altitudes. The clearance plane-input may indicate a particular altitude that a pilot of the aircraft 100 is interested in. The face-on circuit 316 can be configured to cause the face-on display 616 to display a horizontal indicator (e.g., a line or other marker) on the face-on display 616 that indicates the particular altitude that the pilot is interested in.

In some embodiments, the vertical range of the face-on display 616 is generated by the face-on circuit 316 based on the clearance plane input. The vertical range generated by the face-on circuit 316 may be equal to a first predefined amount greater than the clearance plane input and a second predefined amount less than the clearance plane input. The first and second predefined amounts can be any altitude. For example, the first predefined amount may be 7,000 feet while the second predefined amount may be 3,000 feet. If a clearance plane input is 10,000 feet, the vertical range would be 7,000 feet to 17,000 feet with the first and second predefined amounts being 7,000 feet and 3,000 feet. The face-on circuit 316 can be configured to cause the face-on display 616 to display a horizontal indicator on the face-on display 616 that indicates the particular altitude of the clearance plane input and shows precipitation between the determined lower bound and upper bound.

In some embodiments, a pilot can manually set the vertical range of the face-on display 616 via the pilot interface 310. For example, the face-on circuit 316 can be configured to receive an upper bound input and a lower bound input from the pilot via the pilot interface 310. Based on the received upper bound input and the lower bound input, the face-on circuit 316 can be configured to generate the face-on display 616 to include precipitation from the lower bound input to the upper bound input.

In some embodiments, the pilot can input a range and one of the upper bound input or the lower bound input via the pilot interface 310. For example, if the pilot inputs a range of 10,000 feet and an upper bound of 15,000 feet, the face-on circuit 316 can be configured to cause the face-on display 616 to display precipitation from 5,000 feet to 15,000 feet. Likewise, if the pilot inputs a lower bound of 7,000 feet and a range input of 10,000 feet, the face-on circuit 316 can be configured to cause the face-on display 616 to display precipitation from 7,000 feet to 17,000 feet. The pilot can further input the clearance plane which may be between the lower bound input and the upper bound input. The face-on circuit 316 can be configured to cause the face-on display 616 to display a horizontal altitude marker at the clearance plane input between the lower bound input and the upper bound input. If the input clearance plane is outside of the displayed vertical range of precipitations, the face-on display 616 may display an indication that the clearance plane is above or below the range of altitudes shown on the face-on display 616

The face-on display 616 is shown to include the range slider 618. A range indicator 614 (in FIG. 6 20 NM) may indicate the range that the pilot has selected via the slider 618. In some embodiments, the slider 618 is controlled via the pilot interface 310 and/or via the weather radar display screen 312 when the weather radar display screen 312 is a touch screen. The face-on display 616 may display precipitation (e.g., storm cells) from the front of the aircraft 100 to a maximum range of 20 NM based on the selected range input. In some embodiments, the face-on display 616 displays precipitation at a narrow band at a selected range input. In some embodiments, the pilot of the aircraft 100 can set the thickness of the band via the pilot interface 310, the minimum thickness of the band may be limited by the capabilities of the weather radar system 108. In some embodiments, the narrow band may be an arc with a predefined arc length (the arc length may be dependent on the capabilities of the weather radar system 108) and a predefined band thickness (the band thickness may be dependent on the capabilities of the weather radar system 108). For example, if the selected range input is 20 NM and the band thickness is +/−1 NM, the face-on display 616 may display precipitation from 19 NM to 21 NM.

In FIG. 6, the azimuth angle range indicator 622 indicates that the face-on display 616 displays precipitation from 80 degrees to the left of the aircraft 100 to 80 degrees to the right of the aircraft 100. However, the range of azimuth may be +/−40 degrees, +/−60 degrees, +/−90 degrees, or any other range of azimuth angles. Further, via pilot interface 310, a pilot can manually set the range of azimuth for the face-on display 616. Based on the input received from the pilot interface 310, the face-on circuit 316 can be configured to generate face-on display 616 to display precipitation across a range of inputs based on the input received via the pilot interface 310. For example, the pilot can input a range of azimuth as 45 degrees. The face-on circuit 316 can be configured to generate the face-on display 616 45 degrees to the right of the aircraft 100 and 45 degrees to the left of the aircraft 100.

In some embodiments, the pilot can enter a specific range of azimuth to focus on a particular storm system. For example, if a pilot is interested in storm cell 608, the pilot could input 20 degrees to 40 degrees to the right of the aircraft 100. In this regard, the face-on display 616 may be focused on the storm system 608 allowing for the pilot to analyze the storm system in greater detail. This may be useful if the pilot is considering flying over and/or around the storm system 608.

Figure 7:
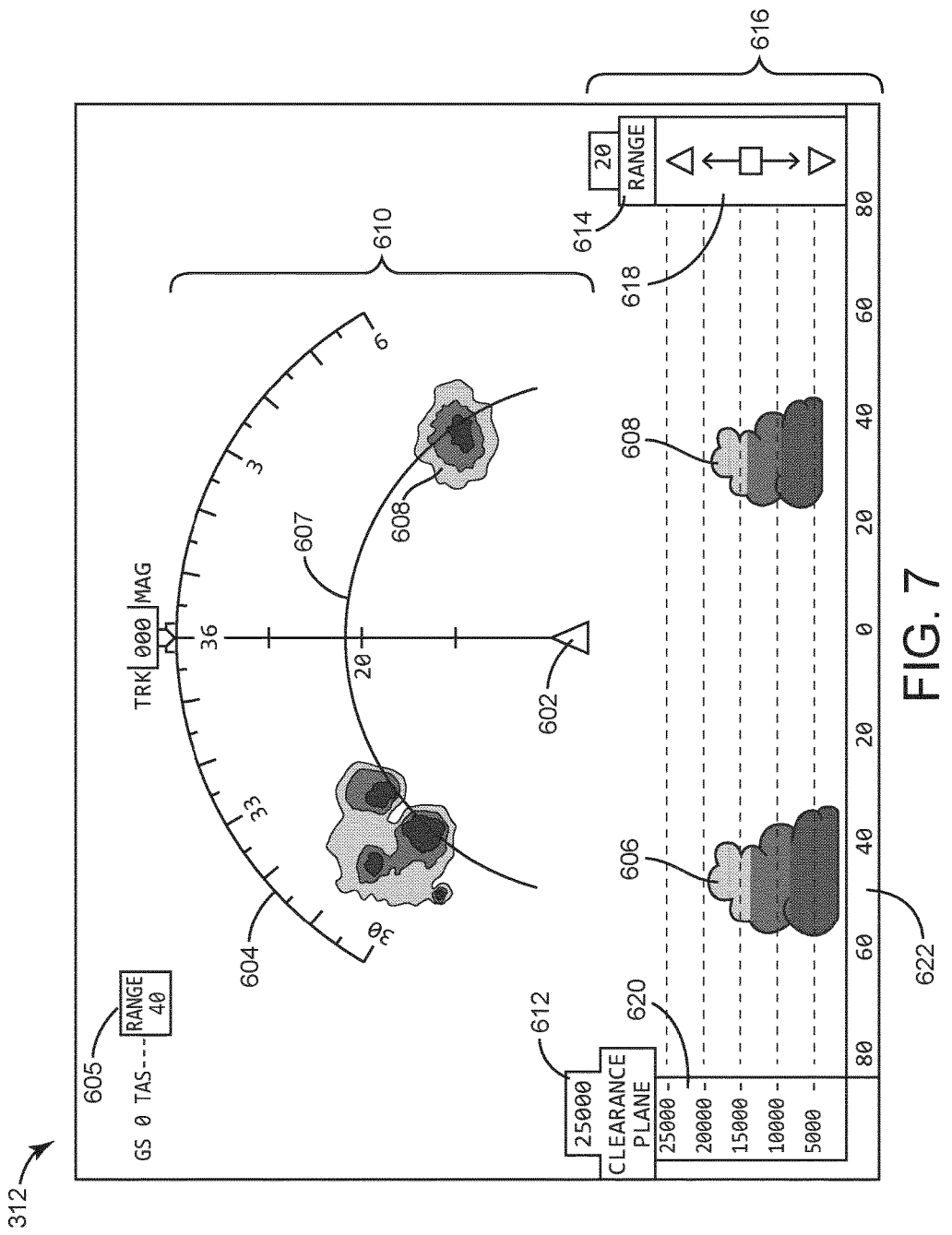
FIG. 7 is an illustration of the overhead display and the face-on display generated by the panoramic weather display system of FIG. 4 being displayed on the radar display screen of FIG. 3 including a range arc according to exemplary aspects of the inventive concepts disclosed herein.

Referring now to FIG. 7, the weather radar display screen 312 is shown including a range arc, according to an exemplary embodiment. FIG. 7 may be the same and/or similar to FIG. 6. However, FIG. 7 includes the range arc 607 on the overhead display 610. The range arc 607 may be an arc that has a radius that is the same (in scale) as the range input that a pilot may input via the slider 618. The range arc 607 may be centered on the marker 602. In this regard, as a pilot adjusts the slider 618, the range arc 607 may adjust in a corresponding fashion. The range arc 607 may help a pilot understand what is being displayed on the face-on display 616.

For example, in some embodiments, face-on display is a two dimensional cross section that corresponds to the range input that a pilot selects via the slider 618. In this regard, a pilot can look at the overhead display 610 to identify what two dimensional cross section is being viewed in the face-on display 616 via the range arc 607. A pilot may be interested in a particular cell, for example the storm cell 606. Since the storm cell 606 is approximately between 20 NM and 30 NM in FIG. 7, a pilot may adjust the slider 618 from 20 NM to 30 NM while watching the face-on display 616. This may allow a pilot to view the precipitation rate of the storm cell 606 for various altitudes from ranges of 20 NM to 30 NM.

Referring now to FIG. 8A, the aircraft 100 of FIG. 1 is shown from a top view according to an exemplary embodiment. The aircraft 100 is shown to be approaching storm systems 802 and 804. The weather radar marker 806 illustrates the range setting of the slider 618 of the face-on display 616 and may indicate the range displayed in the face-on display 616 shown in FIG. 8C. The weather radar system of the aircraft 100 (e.g., the weather radar system 108) is shown to scan across a range of azimuth angles. Notably, the weather radar system 108 scans the storm system 802 and 804. Referring now to FIG. 8B, the aircraft 100 and the storm systems 802 and 804 are shown from a side view according to an exemplary embodiment. The weather radar system 108 of the aircraft 100 is shown to scan vertically. Notably, the weather radar system 108 scans the storm system 802 and 804 across a range of altitudes. The weather radar marker 807 illustrates the vertical scan of the weather radar system 108.

Referring now to FIG. 8C, the weather radar display screen 312 is shown to display the storm systems 802 and 804 of FIGS. 8A-B according to an exemplary embodiment. Storm system marker 808 shown in the overhead display 610 and the face-on display 616 represents the storm system 802 as shown in FIGS. 8A-B. Further, storm system marker 810 shown in the overhead display 610 and the face-on display 616 to represent the storm system 804 as shown in FIGS. 8A-B. The overhead display 610 and the face-on display 616 provide a pilot with consistent forward view of the lateral and vertical of the storm systems 802 and 804. In FIG. 8C, a pilot may determine, based on viewing the overhead display 610 and the face-on display 616 that the storm system 802 is above and to the left of the flight path of the aircraft 100 while the storm system 804 is below and to the right of the flight path of the aircraft 100. A pilot may determine that the current flight path of the aircraft 100 is safe for the aircraft 100 i.e., the aircraft 100 will not be flying through any storm systems.

Referring now to FIG. 9A, the aircraft 100 of FIG. 1 is shown from a top view according to an exemplary embodiment. The aircraft 100 is shown to be approaching storm systems 902, 904 and 906. The weather radar marker 806 as shown and described in FIG. 8A illustrates the range setting of the slider 618 of face-on display 312 and may indicate the range displayed in the face-on display 616 shown in FIG. 9C. The weather radar system of the aircraft 100 (e.g., the weather radar system 108) is shown to scan across a range of azimuth angle. Notably, the weather radar system 108 scans the storm systems 902, 904, and 906. Referring now to FIG. 9B, the aircraft 100 and the storm systems 902, 904 and 906 are shown from a side view according to an exemplary embodiment. The weather radar system 108 of the aircraft 100 is shown to scan vertically. Notably, the weather radar system 108 scans the storm systems 902, 904, and 906. The weather radar marker 807 illustrates the vertical scan of the weather radar system 108.

Referring now to FIG. 9C, the weather radar display screen 312 is shown to display the storm systems 902, 904, and 906 of FIGS. 9A-B according to an exemplary embodiment. Storm system marker 908 shown in the overhead display 610 and the face-on display 616 to represent the storm system 902 as shown in FIGS. 9A-B. Storm system marker 910 shown in the overhead display 610 and the face-on display 616 to represent the storm system 904 as shown in FIGS. 9A-B. Further, storm system marker 912 shown in the overhead display 610 and the face-on display 616 to represent the storm system 906 as shown in FIGS. 9A-B. In FIG. 9C, a pilot may determine, based on viewing the overhead display 610 and the face-on display 616 that the storm system 902 is above and to the left of the flight path of the aircraft 100 while the storm system 906 is below and to the right of the flight path of the aircraft 100. However, a pilot may see, via the overhead display 610 and the face-on display 616 that the storm system 904 is in the flight path of the aircraft 100. A pilot may determine that the current flight path of the aircraft 100 needs to be adjusted up and to the left to fly under the storm system 902.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A radar system for an aircraft, wherein the radar system comprises:
   a weather radar system comprising an antenna system configured to transmit and receive signals, wherein the weather radar system is configured to determine weather data based on the received signals, the weather data comprising an indication of precipitation at a plurality of altitudes, a plurality of azimuth angles, and at a plurality of ranges from the aircraft; and
   a processing circuit configured to:
      receive the weather data from the weather radar system;
      generate an overhead display from an overhead perspective based on the weather data, wherein the overhead display visually illustrates the precipitation at a particular distance from the aircraft and at a particular azimuth angle;
      generate a face-on display from a first person perspective based on the weather data, wherein the face-on display visually illustrates a particular altitude of the precipitation and the particular azimuth angle of the precipitation, wherein the first person perspective is from a point of view of the aircraft in a direction of travel of the aircraft; and
      cause a display screen to display the overhead display and the face-on display.

2. The weather radar system of claim 1, wherein the processing circuit is configured to generate the face-on display to display the precipitation across a range of azimuth angles.

3. The weather radar system of claim 1, wherein the face-on display visually illustrates the precipitation at the particular distance from the aircraft; and
   wherein the processing circuit is configured to:
      receive a range input from a pilot of the aircraft, the range input indicating the particular distance from the aircraft; and
      generate the face-on display to display the precipitation at the range input.

4. The weather radar system of claim 3, further comprising a pilot interface configured to receive the range input from the pilot; and
   wherein the processing circuit is configured to receive the range input from the pilot interface.

5. The weather radar system of claim 3, wherein the overhead display comprises a range arc centered on a marker of the aircraft, wherein the range arc has a radius associated with the range input; and
   wherein the face-on display is a two-dimensional cross section of the precipitation at the range input across a range of azimuth angles and a range of altitudes.

6. The weather radar system of claim 1, wherein the face-on display visually illustrates the precipitation at a range of altitudes; and
   wherein the processing circuit is configured to:
      receive a clearance plane input from a pilot of the aircraft, the clearance plane input indicating a particular clearance altitude;
      determine the range of altitudes based on the received clearance plane; and
      generate the face-on display based on the range of altitudes.

7. The weather radar system of claim 1, wherein the face-on display visually illustrates the precipitation with color, wherein the color indicates a precipitation rate.

8. A method for a radar system for an aircraft, the method comprising
   determining, by a weather radar system, weather data based on signals, wherein the weather radar system transmits and receives the signals via an antenna system;
   receiving, by a panoramic weather display system, weather data from the weather radar system, the weather data comprising an indication of precipitation at a plurality of altitudes, a plurality of azimuth angles, and at a plurality of ranges from the aircraft;

generating, by the panoramic weather display system, an overhead display from an overhead perspective based on the weather data, wherein the overhead display visually illustrates the precipitation at a particular distance from the aircraft and at a particular azimuth angle;

generating, by the panoramic weather display system, a face-on display from a first person perspective based on the weather data, wherein the face-on display visually illustrates a particular altitude of the precipitation and the particular azimuth angle of the precipitation, wherein the first person perspective is from a point of view of the aircraft in a direction of travel of the aircraft; and causing, by the panoramic weather display system, a display screen to display the overhead display and the face-on display.

9. The method of claim 8, further comprising generating, by the panoramic weather display system, the face-on display to display the precipitation across a range of azimuth angles.

10. The method of claim 8, wherein the face-on display visually illustrates the precipitation at the particular distance from the aircraft; and
wherein the method further comprises:
receiving, by the panoramic weather display system, a range input from a pilot of the aircraft, the range input indicating the particular distance from the aircraft; and
generating, by the panoramic weather display system, the face-on display to display the precipitation at the range input.

11. The method of claim 10, further comprising receiving, by the panoramic weather display system, the range input based on an input received from a pilot interface.

12. The method of claim 10, wherein the overhead display comprises a range arc centered on a marker of the aircraft, wherein the range arc has a radius associated with the range input; and
wherein the face-on display is a two-dimensional cross section of the precipitation at the range input across a range of azimuth angles and a range of altitudes.

13. The method of claim 8, wherein the face-on display visually illustrates the precipitation at a range of altitudes; and
wherein the method further comprises:
receiving, by the panoramic weather display system, a clearance plane input from a pilot of the aircraft, the clearance plane input indicating one particular altitude;
determining, by the panoramic weather display system, the range of altitudes based on the received clearance plane; and
generating, by the panoramic weather display system, the face-on display based on the range of altitudes.

14. The method of claim 8, wherein the precipitation of the face-on display visually illustrates the precipitation with color, wherein the color indicates a precipitation rate.

15. A radar system for an aircraft, wherein the radar system comprises:

a weather radar system comprising an antenna system configured to transmit and receive signals, wherein the weather radar system is configured to determine weather data based on the received signals, the weather data comprising an indication of precipitation at a plurality of altitudes, a plurality of azimuth angles, and at a plurality of ranges from the aircraft; and a processing circuit configured to:
receive the weather data from the weather radar system;
generate an overhead display from an overhead perspective based on the weather data, wherein the overhead display visually illustrates the precipitation at a particular distance from the aircraft and at a particular azimuth angle, wherein the overhead display comprises an indicator of the aircraft and a circular element with a constant radius, wherein the circular element is centered on the indicator of the aircraft and the constant radius is the particular distance from the aircraft;
generate a face-on display from a first person perspective based on the weather data, wherein the face-on display visually illustrates the precipitation across a range of azimuth angles and at a range of altitudes at the particular distance from the aircraft, wherein the first person perspective is from a point of view of the aircraft in a direction of travel of the aircraft; and
cause a display screen to display the overhead display and the face-on display.

16. The weather radar system of claim 15, wherein the weather radar system comprises a pilot interface configured to receive an azimuth range input and provide the azimuth range input to the processing circuit;
wherein the processing circuit is configured to cause the range of azimuth angles of the face-on display to be the azimuth range input.

17. The weather radar system of claim 15, wherein the processing circuit is configured to:
receive a range input from a pilot of the aircraft, the range input indicating the particular distance from the aircraft; and
generate the face-on display based on the range input to display the precipitation at the range input.

18. The weather radar system of claim 17, wherein the display screen is a touch screen, wherein the face-on display comprises a range slider that the pilot can interact with; and
wherein the processing circuit is configured to receive the range input based on input received at the touch screen from the range slider.

19. The weather radar system of claim 15, wherein the processing circuit is configured to:
receive a clearance plane input from a pilot of the aircraft, the clearance plane input indicating a particular altitude;
determine the range of altitudes based on the received clearance plane; and
generate the face-on display based on the range of altitudes.

20. The weather radar system of claim 15, wherein the precipitation of the face-on display is visually illustrated with color, wherein the color indicates a precipitation rate.

* * * * *